(12) United States Patent
Yamamoto et al.

(10) Patent No.: US 11,063,484 B2
(45) Date of Patent: Jul. 13, 2021

(54) ELECTRIC MOTOR AND AIR CONDITIONER

(71) Applicant: Mitsubishi Electric Corporation, Tokyo (JP)

(72) Inventors: Mineo Yamamoto, Tokyo (JP); Tomoaki Oikawa, Tokyo (JP); Hiroyuki Ishii, Tokyo (JP); Hiroki Aso, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 389 days.

(21) Appl. No.: 16/073,150

(22) PCT Filed: Apr. 27, 2016

(86) PCT No.: PCT/JP2016/063295
§ 371 (c)(1),
(2) Date: Jul. 26, 2018

(87) PCT Pub. No.: WO2017/187580
PCT Pub. Date: Nov. 2, 2017

(65) Prior Publication Data
US 2019/0044399 A1    Feb. 7, 2019

(51) Int. Cl.
*H02K 1/27* (2006.01)
*H02K 1/30* (2006.01)
(Continued)

(52) U.S. Cl.
CPC ............. *H02K 1/2733* (2013.01); *H02K 1/30* (2013.01); *H02K 15/03* (2013.01); *F25B 2327/00* (2013.01); *H02K 11/215* (2016.01)

(58) Field of Classification Search
CPC ....... H02K 1/2786; H02K 15/02; H02K 11/25
(Continued)

(56) References Cited

U.S. PATENT DOCUMENTS

| 2011/0036127 A1 | 2/2011 | Lee |
| 2013/0285482 A1 | 10/2013 | Yamamoto et al. |
| 2016/0233747 A1* | 8/2016 | Aso ..................... H02K 11/215 |

FOREIGN PATENT DOCUMENTS

| CN | 101997346 A | 3/2011 |
| CN | 103329402 A | 9/2013 |

(Continued)

OTHER PUBLICATIONS

Office Action dated Dec. 13, 2019 issued in corresponding CN patent application No. 201680084735.4 (and English machine translation).

(Continued)

*Primary Examiner* — Jose A Gonzalez Quinones
(74) *Attorney, Agent, or Firm* — Posz Law Group, PLC

(57) ABSTRACT

The rotor of the electric motor includes a rotor magnet. The rotor magnet includes a yoke, and a resin magnet part formed of a resin material containing rare-earth magnetic powder, which is disposed outside the yoke. Multiple pedestals and multiple connecting portions are formed on an end surface of the yoke. The connecting portion joins together the adjacent pedestals. The connecting portions are disposed in a middle position of the end surface in the radial direction. The connecting portions each have a height less than the height of the pedestals. The present invention gains advantage in that the amount of rare-earth magnetic powder used in the rotor magnet can be reduced.

10 Claims, 9 Drawing Sheets

(51) Int. Cl.
*H02K 15/03* (2006.01)
*H02K 11/215* (2016.01)

(58) Field of Classification Search
USPC ........................................ 310/43, 44, 156.08
See application file for complete search history.

(56) References Cited

FOREIGN PATENT DOCUMENTS

| | | |
|---|---|---|
| JP | 2011-061937 A | 3/2011 |
| JP | 2011-061938 A | 3/2011 |
| JP | 2011-120334 A | 6/2011 |
| JP | 2012-151979 A | 8/2012 |
| JP | 2015-220794 A | 7/2015 |

OTHER PUBLICATIONS

International Search Report ("ISR") dated Aug. 2, 2016 issued in corresponding international patent application No. PCT/JP2016/063295.

Office Action dated May 29, 2020 issued in corresponding CN patent application No. 201680084735.4 (and English translation).

* cited by examiner

ELECTRIC MOTOR AND AIR CONDITIONER

CROSS REFERENCE TO RELATED APPLICATION

This application is a U.S. national stage application of International Patent Application No. PCT/JP2016/063295 filed on Apr. 27, 2016, the disclosure of which is incorporated herein by reference.

TECHNICAL FIELD

The present invention relates to an electric motor including a rotor having a rotor magnet, and to an air conditioner including such an electric motor.

BACKGROUND

A rotor described in Patent Literature 1 includes a rotor magnet having an annular shape, and a position detection magnet having an annular shape disposed at one end of the rotor magnet. The rotor magnet includes an annular yoke formed of a resin material containing soft magnetic powder or ferrite powder, and an annular resin magnet part formed of a resin material containing rare-earth magnetic powder, which is formed on an outer circumferential surface of the yoke.

In this regard, the yoke has, on one end surface thereof, multiple grooves extending radially from the inner circumferential surface of the yoke to the outer circumferential surface of the yoke. The multiple grooves each serve as a channel for introducing a resin material containing rare-earth magnetic powder during formation of the resin magnet part. The multiple grooves are embedded with their respective multiple rib runners.

Meanwhile, the resin magnet part includes, on one end surface thereof, multiple pedestals on which the position detection magnet is placed, and multiple protrusions disposed outside the multiple pedestals, respectively, for holding the position detection magnet from an outer side. The multiple pedestals and the multiple protrusions are formed using the multiple rib runners described above.

PATENT LITERATURE

Patent Literature 1: Japanese Patent Application Laid-open No. 2011-120334

An increase in the amount of rare-earth magnetic powder used generally causes an increase in cost, and thus it is desirable to make a reduction in the amount of rare-earth magnetic powder used.

SUMMARY

The present invention has been made in view of the foregoing circumstances, and it is an object of the present invention to provide an electric motor that can make a reduction in the amount of rare-earth magnetic powder used in a rotor magnet.

In order to solve the above-mentioned problems and achieve the object, the present invention provides an electric motor comprising a rotor comprising a first magnet having an annular shape and a second magnet having an annular shape, the second magnet being disposed at one end of the first magnet in an axial direction of the first magnet and being used for position detection, wherein the first magnet comprises a first annular layer formed of resin containing at least one of soft magnetic powder and ferrite powder, and a second annular layer disposed on an outer circumferential surface of the first annular layer, the second annular layer being formed of resin containing rare earth magnetic powder, the first annular layer comprises an end surface in the axial direction, first and second pedestals disposed on the end surface, arrayed in a circumferential direction of the first magnet, and having thereon the second magnet, and a connecting portion disposed on the end surface, the connecting portion connecting the first and second pedestals, a height of the connecting portion from the end surface in the axial direction being smaller than a height of each of the first and second pedestals from the end surface in the axial direction.

The present invention has an advantageous effect in that the amount of rare-earth magnetic powder used in a rotor magnet can be reduced.

DETAILED DESCRIPTION

An electric motor and an air conditioner according to embodiments of the present invention will be described in detail below with reference to the drawings. Note that this invention is not necessarily limited by these embodiments.

First Embodiment

Figure 1:
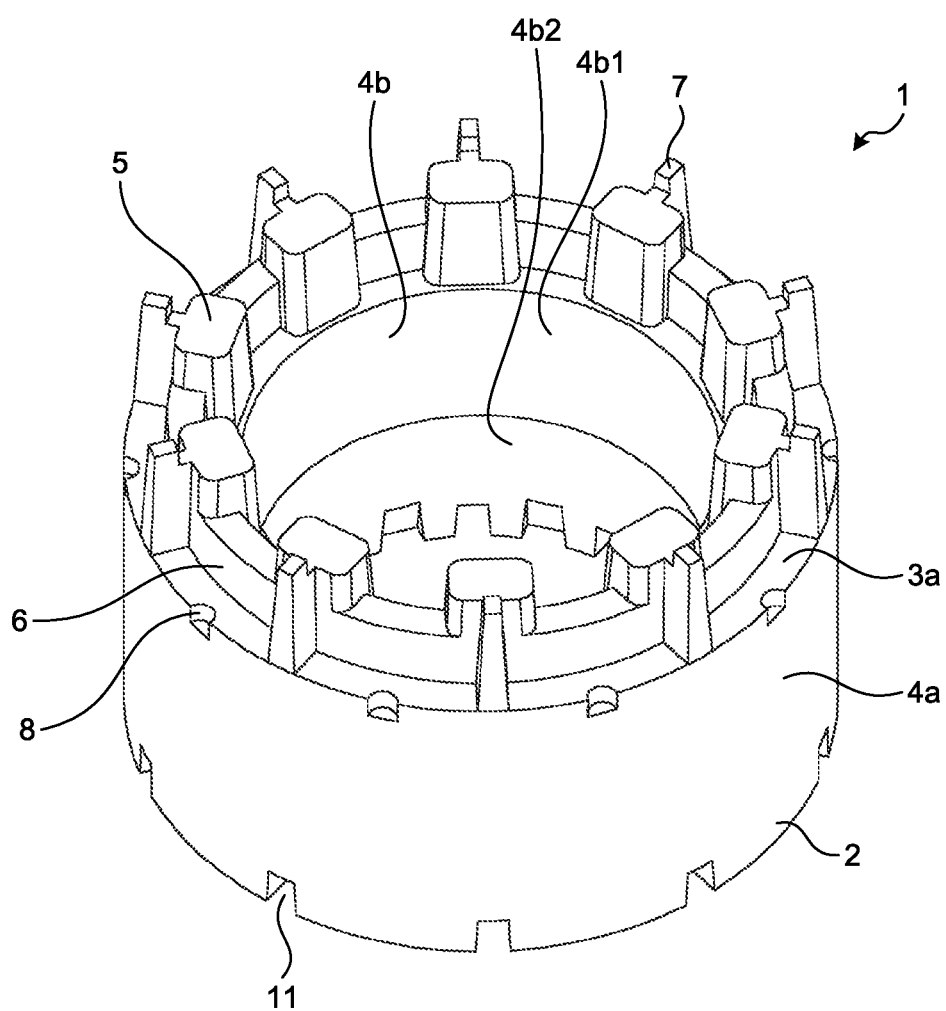
FIG. 1 is a perspective view illustrating a configuration of a yoke in a first embodiment.
Figure 2:
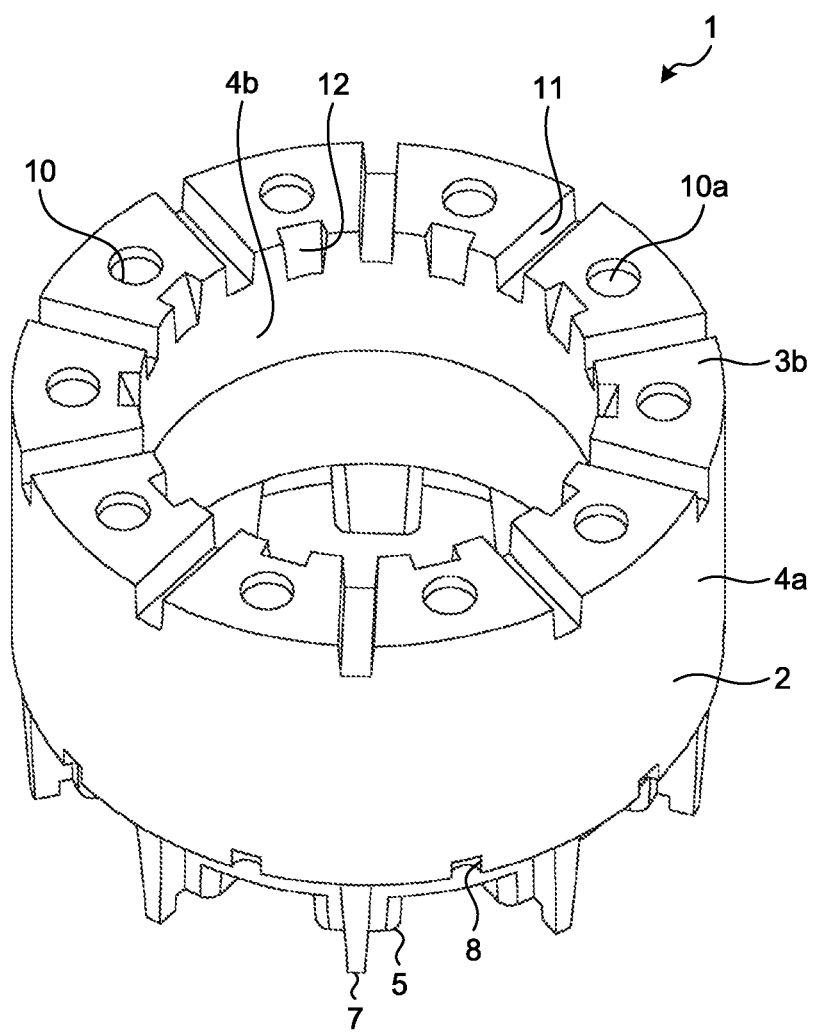
FIG. 2 is another perspective view illustrating the configuration of the yoke in the first embodiment.
Figure 3:
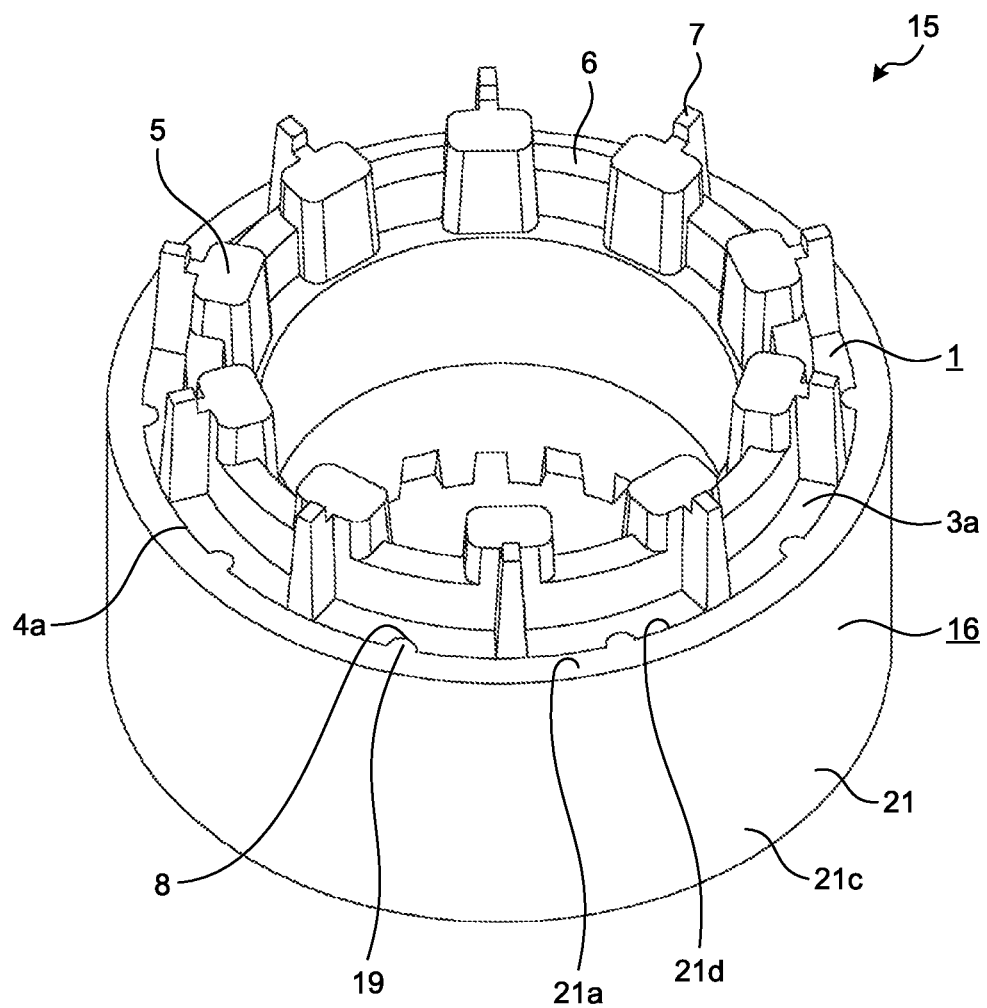
FIG. 3 is a perspective view illustrating a configuration of a rotor magnet in the first embodiment.
Figure 4:
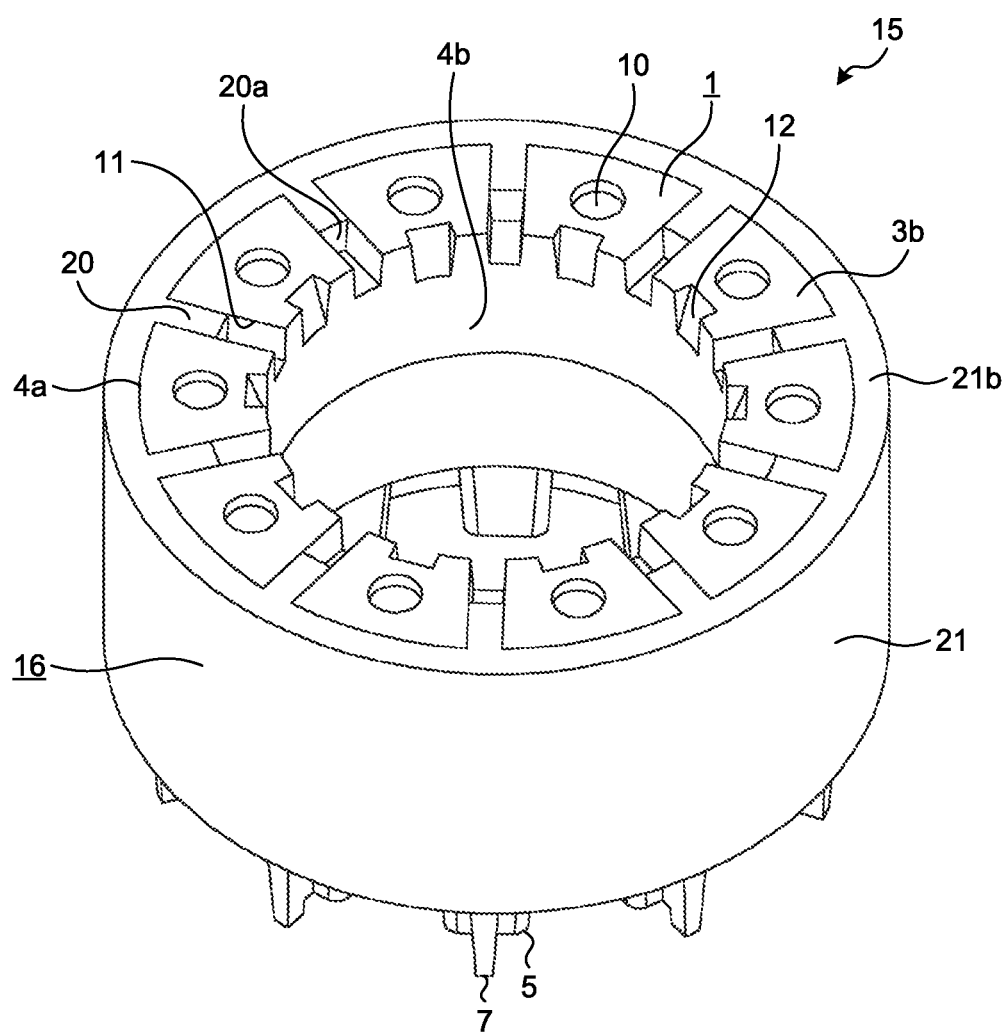
FIG. 4 is another perspective view illustrating the configuration of the rotor magnet in the first embodiment.
Figure 5:
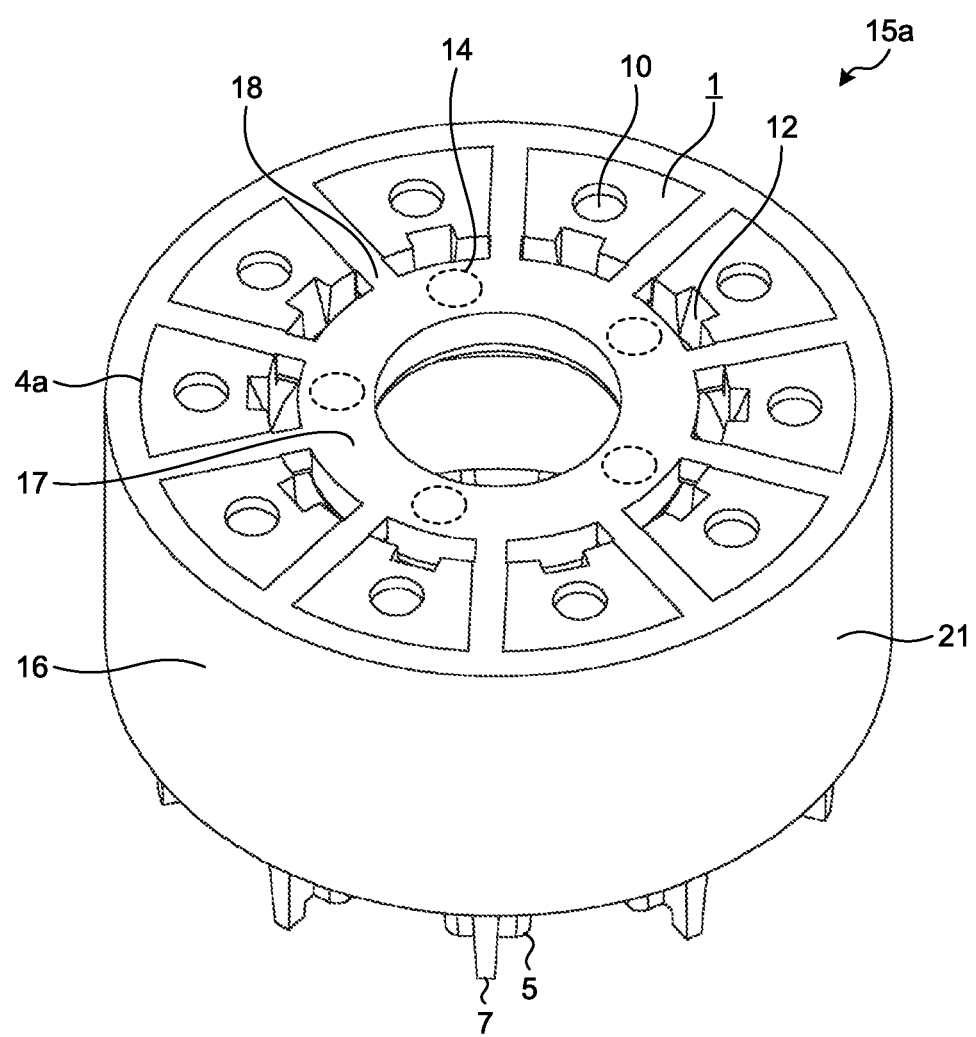
FIG. 5 is a perspective view illustrating a configuration of a rotor magnet having runners in the first embodiment.
Figure 6:
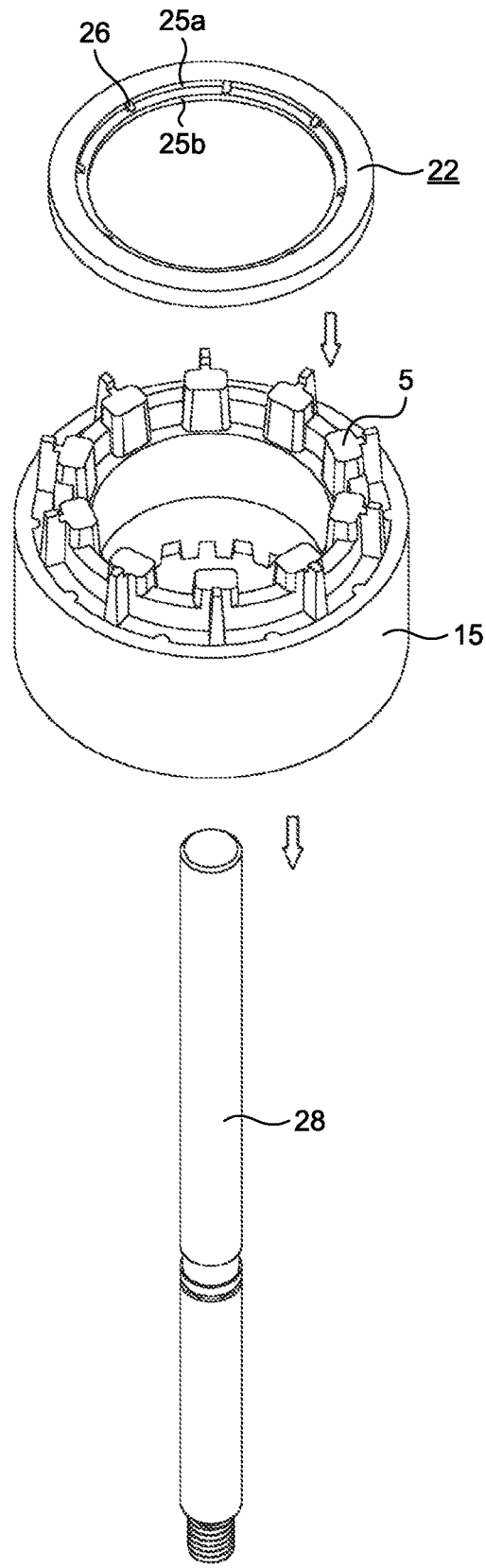
FIG. 6 is a perspective view illustrating a method for assembling a rotor according to the first embodiment.
Figure 7:
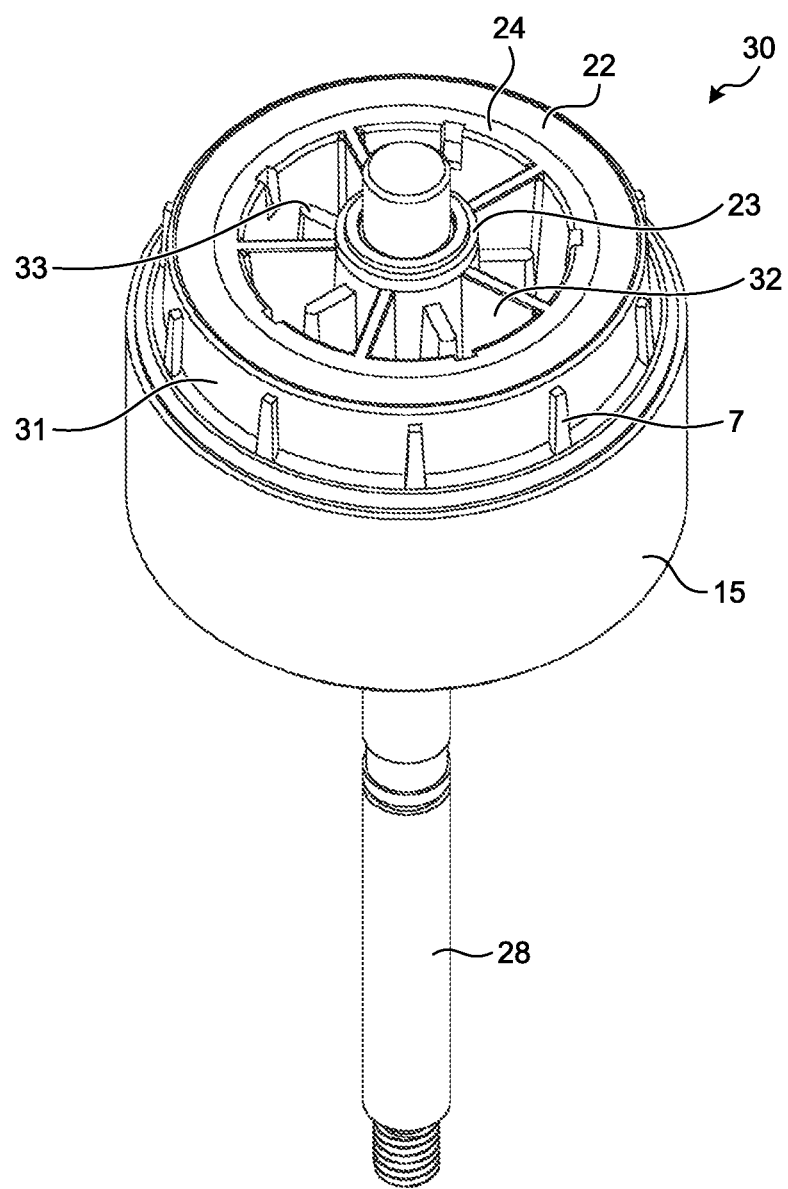
FIG. 7 is a perspective view illustrating a configuration of the rotor according to the first embodiment.

FIG. 1 is a perspective view illustrating a configuration of a yoke in the present embodiment. FIG. 2 is another perspective view illustrating the configuration of the yoke in the present embodiment. FIG. 3 is a perspective view illustrating a configuration of a rotor magnet in the present embodiment. FIG. 4 is another perspective view illustrating the configuration of the rotor magnet in the present embodiment. FIG. 5 is a perspective view illustrating a configuration of a rotor magnet having runners in the present embodiment. FIG. 6 is a perspective view illustrating a method for assembling a rotor according to the present embodiment. FIG. 7 is a perspective view illustrating a configuration of the rotor according to the present embodiment.

The configuration of a yoke 1 will first be described mainly with reference to FIGS. 1 and 2. The yoke 1 is a first annular layer. The yoke 1 is formed of a resin material containing at least one of soft magnetic powder and ferrite powder. This resin material is thermoplastic resin (e.g., nylon). The yoke 1 is formed by injection molding of the resin material containing at least one of soft magnetic powder and ferrite powder.

The yoke 1 includes a cylindrical portion 2 that is a first tubular portion. The cylindrical portion 2 has end surfaces 3a and 3b that are first and second end surfaces, respectively, which are situated axially away from each other. The end surfaces 3a and 3b are end surfaces of the cylindrical portion 2. The end surface 3a is opposed to a sensor magnet 22 described later in an axial direction. The cylindrical portion 2 has an outer circumferential surface 4a and an inner circumferential surface 4b which are situated radially away from each other. Note that the first tubular portion does not necessarily need to have a cylindrical shape, but may have, for example, a corrugated outer circumferential surface.

As used herein, the term "axial direction" refers to an axial direction of a rotor magnet 15 described below. The yoke 1 is disposed coaxially with the rotor magnet 15, and so this means that the axial direction of the rotor magnet 15 is identical with an axial direction of the yoke 1. In addition, the axial direction of the rotor magnet 15 is also identical with an axial direction of a rotor 30 described below. Similarly, the term "radial direction" refers to a radial direction of the rotor magnet 15, to a radial direction of the yoke 1, and to a radial direction of the rotor 30.

The yoke 1 includes multiple pedestals 5 on the end surface 3a. The multiple pedestals 5 are arranged at regular intervals in the circumferential direction. As used herein, the term "circumferential direction" refers to a circumferential direction of the rotor magnet 15, to a circumferential direction of the yoke 1, and to a circumferential direction of the rotor 30.

The multiple pedestals 5 are disposed at positions of multiple magnetic poles, respectively. In the illustrated example, the number of the pedestals 5 is 10, and the number of the magnetic poles of the rotor 30 is 10. On the pedestals 5, the sensor magnet 22 is mounted. The pedestals 5 are formed integrally with the cylindrical portion 2.

The yoke 1 has multiple protrusions 7 on the end surface 3a. The protrusions 7 are disposed radially outside the pedestals 5. The protrusions 7 each have a height greater than the height of the pedestal 5. The height of the protrusion 7 is herein defined as a height from the end surface 3a in the axial direction. The height of the pedestal 5 is defined similarly. The protrusions 7 are formed integrally with the pedestals 5.

The yoke 1 has multiple connecting portions 6 on the end surface 3a. The connecting portions 6 are each disposed between circumferentially adjacent ones of the pedestals 5 to connect the circumferentially adjacent pedestals 5. The two pedestals 5 that are circumferentially adjacent to each other may be called a first pedestal and a second pedestal, respectively. One protrusion 7 that is situated radially outside the first pedestal is a first protrusion, and another protrusion 7 that is situated radially outside the second pedestal is a second protrusion. The multiple connecting portions 6 and the multiple pedestals 5 are arranged alternately in the circumferential direction, and the multiple connecting portions 6 connect the multiple pedestals 5 integrally. The multiple connecting portions 6 are formed integrally with the multiple pedestals 5. The multiple pedestals 5 are reinforced by the multiple connecting portions 6. This configuration improves the quality of the yoke 1.

The connecting portions 6 each have a height less than the height of the pedestals 5. The height of the connecting portion 6 is herein defined as a height from the end surface 3a in the axial direction. The connecting portions 6 are formed radially spaced apart from both the outer circumferential surface 4a and the inner circumferential surface 4b. Specifically, the connecting portions 6 are disposed radially in the center of the end surface 3a. The connecting portions 6 each have an arc shape in a plane view as viewed in the axial direction.

The yoke 1 has multiple recessed portions 8 on an outer circumferential edge of the end surface 3a. That is, the multiple recessed portions 8 are formed in the cylindrical portion 2. The multiple recessed portions 8 are arranged at regular intervals in the circumferential direction. The recessed portions 8 are each disposed between two adjacent magnetic poles. That is, the recessed portions 8 are each situated between the two protrusions 7 circumferentially adjacent to each other. The recessed portions 8 each have a semicircle shape in a plane view as viewed in the axial direction. The recessed portions 8 are each formed to have a fixed depth from the end surface 3a in the axial direction. The recessed portions 8 are concave with respect to both the end surface 3a and the outer circumferential surface 4a. As described later, the multiple recessed portions 8 serve as rotation stoppers for the resin magnet part 16 formed around the outer circumferential surface 4a of the yoke 1. The recessed portion 8 is called a first recessed portion.

The yoke 1 has multiple recessed portions 10 arranged on the end surface 3b at regular intervals in the circumferential direction. The recessed portions 10 are each disposed between two adjacent magnetic poles. The recessed portions 10 are each disposed between the pedestals 5 in a plane view as viewed in the axial direction. The number of the recessed portions 10 is equal to the number of the magnetic poles. Each recessed portion 10 is circular in a plane view as viewed in the axial direction. The recessed portion 10 is called a second recessed portion. The recessed portion 10 has a gate mark 10a situated at the center thereof. The gate mark 10a is a trace of treatment of a gate port for introducing a resin material containing at least one of soft magnetic powder and ferrite powder. The use of the same number of gate ports as the number of the magnetic poles as described above ensures uniform injection conditions of the above-mentioned resin material over the magnetic poles, and hence uniform magnetic field orientation, thereby improving the quality of the yoke 1.

The gate ports are each disposed between the pedestals 5 in a plane view as viewed in the axial direction. By this configuration, a position of the pedestal 5 is a weld position, thereby making it possible to ensure that the pedestal 5 has a sufficient thickness.

The recessed portions 10 each have a sufficient depth to prevent the gate mark 10a from protruding beyond the end surface 3b. This configuration prevents a burr remaining in the gate mark 10a from protruding beyond the end surface 3b, thereby improving the quality of the yoke 1.

The yoke 1 has multiple grooves 11 arranged on the end surface 3b at regular intervals in the circumferential direction. The grooves 11 are each disposed between the recessed portions 10 circumferentially adjacent to each other. That is, the multiple grooves 11 and the multiple recessed portions 10 are arranged alternately in the circumferential direction. The grooves 11 extend radially from the inner circumferential surface 4b to the outer circumferential surface 4a. The multiple grooves 11 extend radially outwardly from the center of the yoke 1 in a plane view as viewed in the axial direction. The multiple grooves 11 are disposed at positions of the multiple magnetic poles, respectively. As described later, the grooves 11 each serve as a channel for introducing a resin material containing rare-earth magnetic powder during formation of the resin magnet part 16 around the outer circumferential surface 4a of the yoke 1.

The yoke 1 has therein a hollow portion defined by the inner circumferential surface 4b. The inner circumferential surface 4b consists of a tapered part 4b1 formed on the end surface 3a side, and a straight part 4b2 formed on the end surface 3b side. In this regard, the tapered part 4b1 has a taper shape whose inner diameter decreases from the end surface 3a toward the end surface 3b in the axial direction. The straight part 4b2 has a constant inner diameter regardless of a position in the axial direction. The tapered part 4b1 is formed using a movable mold of a set of molds not illustrated, while the straight part 4b2 is formed using a stationary mold of the set of molds not illustrated. In this regard, the mold refers to a mold for molding the yoke 1.

The yoke 1 has multiple indentations 12 on an inner circumferential edge of the end surface 3b. The multiple indentations 12 are arranged at regular intervals in the circumferential direction. The indentations 12 are each disposed between magnetic poles. The indentations 12 each have a constant width in the circumferential direction, and are inclined with respect to the axial direction.

The yoke 1 can be polar-anisotropically oriented. That is, by arranging magnets around the mold to apply an oriented magnetic field to the yoke 1 during molding of the yoke 1, the soft magnetic powder or the ferrite powder contained in the yoke 1 is polar-anisotropically oriented with respect to the polar direction. Such polar anisotropic orientation causes the magnetic flux to concentrate in a magnetic pole center, thereby enabling the magnetic intensity to be increased.

The configuration of the rotor magnet 15 will next be described mainly with reference to FIGS. 3 and 4. The rotor magnet 15 includes the yoke 1 and the resin magnet part 16 disposed on the outer circumferential surface 4a of the yoke 1. The rotor magnet 15 has an annular shape.

The resin magnet part 16 is a second annular layer. The resin magnet part 16 is formed from a resin material containing rare-earth magnetic powder. In this regard, the rare-earth magnetic powder is, for example, samarium iron nitrogen (SmFeN) magnet powder or neodymium magnet powder. The resin material is a thermoplastic resin material, e.g., nylon. The resin magnet part 16 is formed by injection molding of a resin material containing rare-earth magnetic powder. The resin magnet part 16 is integrally molded on the outer circumferential surface 4a of the yoke 1. The resin material containing rare-earth magnetic powder is hereinafter referred to as "resin magnet."

The resin magnet part 16 includes a cylindrical portion 21 that is a second tubular portion. The cylindrical portion 21 has end surfaces 21a and 21b that are third and fourth end surfaces, respectively, that are disposed axially spaced apart from each other. The end surface 21a is situated at the same axial position as the end surface 3a. This means that the end surface 21a is flush with the end surface 3a. The end surface 21b is disposed at the same axial position as the end surface 3b. This means that the end surface 21b is flush with the end surface 3b. The cylindrical portion 21 has an outer circumferential surface 21c and an inner circumferential surface 21d that are situated radially spaced apart from each other.

The resin magnet part 16 has multiple rib portions 20 joined to the cylindrical portion 21. The multiple rib portions 20 are disposed in the grooves 11, respectively. The multiple rib portions 20 are disposed at positions of the multiple magnetic poles, respectively. The rib portions 20 extend for a fixed length inwardly from the inner circumferential surface 21d of the cylindrical portion 21 in the radial direction. A length of the rib portion 20 in the radial direction is less than a length of the groove 11 in the radial direction. That is, the rib portions 20 each have an edge surface 20a that does not reach the inner circumferential surface 4b of the yoke 1 in the radial direction. In other words, the edge surface 20a is positioned radially outside the inner circumferential surface 4b.

The resin magnet part 16 has multiple protruding portions 19 on the inner circumferential surface 21d of the cylindrical portion 21. The multiple protruding portions 19 fit into the multiple recessed portions 8 provided on the yoke 1, respectively.

Next, description is given for an outline of a method for manufacturing the rotor magnet 15 with reference to FIGS. 1 to 5. After placing the yoke 1 in a mold not illustrated, a resin magnet material is injected into the yoke 1 to mold the resin magnet part 16 integrally with the yoke 1. In this regard, the mold is a mold for molding the resin magnet part 16.

By arranging magnets around the mold to apply an oriented magnetic field to the resin magnet part 16 during molding of the resin magnet part 16, the rare-earth magnetic powder contained in the resin magnet part 16 is anisotropically oriented with respect to the polar direction.

The movable and stationary molds of the set of molds have a core portion which is to be inserted into the hollow portion of the yoke 1. The yoke 1 is subjected to the insertion of the core portion from the end surface 3a side to be set in the movable mold. As described above, the inner circumferential surface 4b of the yoke 1 has the straight part 4b2. Elimination of a gap between the straight part 4b2 and the core portion suppresses leakage of the resin magnet material to the gap, and thus improves the quality of the rotor magnet 15.

In addition, the movable mold has multiple recessed portions into which the multiple protrusions 7 of the yoke 1 fit, respectively. This structure establishes positioning of the yoke 1 relative to the positions of the magnets that generate the oriented magnetic field when the oriented magnetic field is applied to the resin magnet part 16.

A toroidal runner 17 that will serve as a channel for introducing the resin magnet material is formed inside the yoke 1. The toroidal runner 17 is formed on an end surface of the core portion of the movable and stationary molds. The toroidal runner 17 has multiple resin inlet portions 14 arranged at regular intervals in the circumferential direction. The number of the resin inlet portions 14 is half the number of the magnetic poles.

Multiple rib runners 18 extend radially outwardly from the outer circumferential surface of the toroidal runner 17. The number of the rib runners 18 is the same as the number of the grooves 11, and the same as the number of the magnetic poles. The multiple rib runners 18 are placed in the multiple grooves 11, respectively. A width of the rib runner 18 is equal to a width of the groove 11, and a height of the rib runner 18 is equal to the depth of the groove 11. Similarly to the toroidal runner 17, the multiple rib runners 18 serve as a channel for introducing the resin magnet material. The use of the same number of the rib runners 18 as the number of the magnetic poles ensures uniform injection conditions of the resin magnet material over the magnetic poles, and hence uniform magnetic field orientation, thereby improving the quality of the rotor magnet 15.

The resin magnet material flows from the multiple resin inlet portions 14 through the toroidal runner 17 and the multiple rib runners 18 in sequence onto the outer circumferential surface 4a of the yoke 1. As a result of the flow, the cylindrical portion 21 is formed. The resin magnet material also fills the multiple recessed portions 8 formed on the end surface 3a of the yoke 1. By doing so, on the inner circumferential surface 21d of the cylindrical portion 21, the multiple protruding portions 19 is formed, the portions 19 fitting in the multiple recessed portions 8, respectively.

As described above, the resin magnet is molded integrally with the yoke 1, and thus the rotor magnet 15a with runners illustrated in FIG. 5 is obtained. Then, the rib runners 18 are cut off, part of each of the rib runners 18 remains in the groove 11 to form the rib portion 20, and the remainders of the rib runners 18 and the toroidal runner 17 are removed. Thus, the rotor magnet 15 illustrated in FIGS. 3 and 4 is obtained.

Although not illustrated, axial runners are connected to the multiple resin inlet portions 14, respectively. As in the illustrated example, reduction of the number of the resin inlet portions 14 to half the number of the magnetic poles can reduce the total amount of the runners as compared with when the number of the resin inlet portions 14 is equal to the number of the magnetic poles. In addition, in the case where runners not to be used for the product are reused, the reduction in the total amount of the runners results in a reduction in reuse ratio, and thus reduces degradation of physical properties of the resin magnet, thereby improving the quality of the product. The term "physical properties of the resin magnet" herein refers mainly to mechanical strength properties.

The configuration of the rotor 30 according to the present embodiment will next be described mainly with reference to FIGS. 6 and 7. The rotor 30 includes the rotor magnet 15, the sensor magnet 22, which serves as a position detection magnet, having an annular shape and disposed at one axial end of the rotor magnet 15, a shaft 28 penetrating the rotor magnet 15 and the sensor magnet 22, and a resin portion 31, which integrates together the rotor magnet 15, the sensor magnet 22, and the shaft 28. In this regard, the resin portion 31 is formed of a thermoplastic resin material. The thermoplastic resin material is, for example, polybutylene terephthalate. The rotor magnet 15 is a first magnet, and the sensor magnet 22 is a second magnet.

The sensor magnet 22 is mounted on the multiple pedestals 5. The sensor magnet 22 is disposed coaxially with the rotor magnet 15. The sensor magnet 22 has steps 25a and 25b on both axial end portions of the inner circumferential surface thereof. The sensor magnet 22 has an axially symmetric shape. The steps 25a and 25b are overlaid with the resin portion 31 to prevent the sensor magnet 22 from slipping out in the axial direction. The sensor magnet 22 has multiple rib portions 26 circumferentially arranged on the inner circumferential surface thereof. A configuration only including one of the steps 25a and 25b may also be used. The multiple rib portions 26 are encompassed by the resin portion 31 to serve as a rotation stopper of the sensor magnet 22 in the circumferential direction.

The resin portion 31 includes a cylindrical portion 23 formed around the outer circumferential surface of the shaft 28, a cylindrical portion 24 formed around the inner circumferential surface of the yoke 1, multiple rib portions 32 circumferentially arranged to radially join together the cylindrical portion 23 and the cylindrical portion 24, and multiple gate protruding portions 33 connected to the cylindrical portion 23 and each disposed between the rib portions 32 adjacent to each other.

The gate protruding portions 33 extend radially outwardly from the cylindrical portion 23 for a length insufficient to reach the cylindrical portion 24. The gate protruding portions 33 each serve as an inlet port for a thermoplastic resin material. The thermoplastic resin material is directly injected from the gate protruding portions 33 toward the outer circumferential surface of the shaft 28, thereby making it possible to fill the cylindrical portion 23 in the shortest time period. This improves the weld strength of the cylindrical portion 23, thereby improving the quality of the rotor 30.

In the illustrated example, each of the number of the rib portions 32 and the number of the gate protruding portions 33 is half the number of the magnetic poles. Note that the number, the thickness, and the length of the rib portions 32 are not limited to those of the illustrated example, nor are the number, the thickness, and the length of the gate protruding portions 33.

The resin portion 31 fills multiple gaps made between the multiple connecting portions 6 and the sensor magnet 22. The resin portion 31 also buries the protrusions 7 to a fixed height from the end surface 3a in the axial direction. A portion of each of the protrusions 7 extends out of the resin portion 31. In addition, the resin portion 31 connects circumferentially adjacent ones of the protrusions 7. The multiple protrusions 7 extending out of the resin portion 31 can also be used to provide positioning during magnetization of the rotor 30.

Next, description is given for an outline of a method for manufacturing the rotor 30. First, the rotor magnet 15 is placed in a lower mold half of a mold set of a vertical molding machine. The rotor magnet 15 is set into the lower mold half from a side of the end surface 3b having thereon the indentations 12. On this occasion, the rotor magnet 15 is set in the lower mold half in such a manner that the indentations 12 are fit on protruding portions of the mold. This ensures certain coaxiality after the molding between the rotor magnet 15 and the shaft 28.

Then, the shaft 28 is placed at the center of the rotor magnet 15, and the sensor magnet 22 is mounted on the multiple pedestals 5 so that the sensor magnet 22 is held by the multiple protrusions 7. After the rotor magnet 15, the shaft 28, and the sensor magnet 22 are set in the lower mold half, the upper and lower mold halves of the mold set are paired with each other, and then the thermoplastic resin material is injected into the mold.

The thermoplastic resin material flows through the multiple gate protruding portions 33, the cylindrical portion 23, the multiple rib portions 32, and the cylindrical portion 24 in sequence to reach the rotor magnet 15 and the sensor magnet 22. The thermoplastic resin material flows through the multiple gaps made between the multiple connecting portions 6 and the sensor magnet 22 to fill a space radially outside the multiple pedestals 5 and the multiple connecting portions 6. On this occasion for the filling, the thermoplastic resin material buries the protrusions 7 to the extent of a fixed height from the end surface 3a in the axial direction. Note that the entire protrusion 7 is not buried in the thermoplastic resin material, but a portion of the protrusion 7 extends out of the thermoplastic resin material. The thermoplastic resin material is also introduced to fill the multiple gaps mentioned above, and to connect circumferentially adjacent ones of the protrusions 7. That is, the multiple protrusions 7 are joined together by the resin portion 31. The resin portion 31 as described above improves transmission of rotary torque of the rotor magnet 15 to the shaft 28.

In addition, the thermoplastic resin material is introduced to fill the multiple recessed portions 10 and to bury the multiple pedestals 5. This improves torque transmission, and provides an anti-rotation feature to the resin portion 31 with respect to the rotor magnet 15. Moreover, even in a case of the thermoplastic resin being subjected to molding shrinkage in the radial direction, the resin portion 31 is caught by the multiple recessed portions 10 and the multiple pedestals 5, thereby preventing formation of a gap, and preventing reduction in binding force. That is, the use of the multiple recessed portions 10 and the multiple pedestals 5 eliminates the need to add a structure for preventing reduction in binding force, thereby enabling cost reduction and noise reduction.

Furthermore, introducing the thermoplastic resin material with the end surfaces 21a and 21b of the resin magnet part 16 being secured using the mold prevents burrs from being generated on the end surfaces 21a and 21b, thereby eliminating the need for removing the burrs. This improves the productivity, and also improves the quality of the product.

Figure 8:
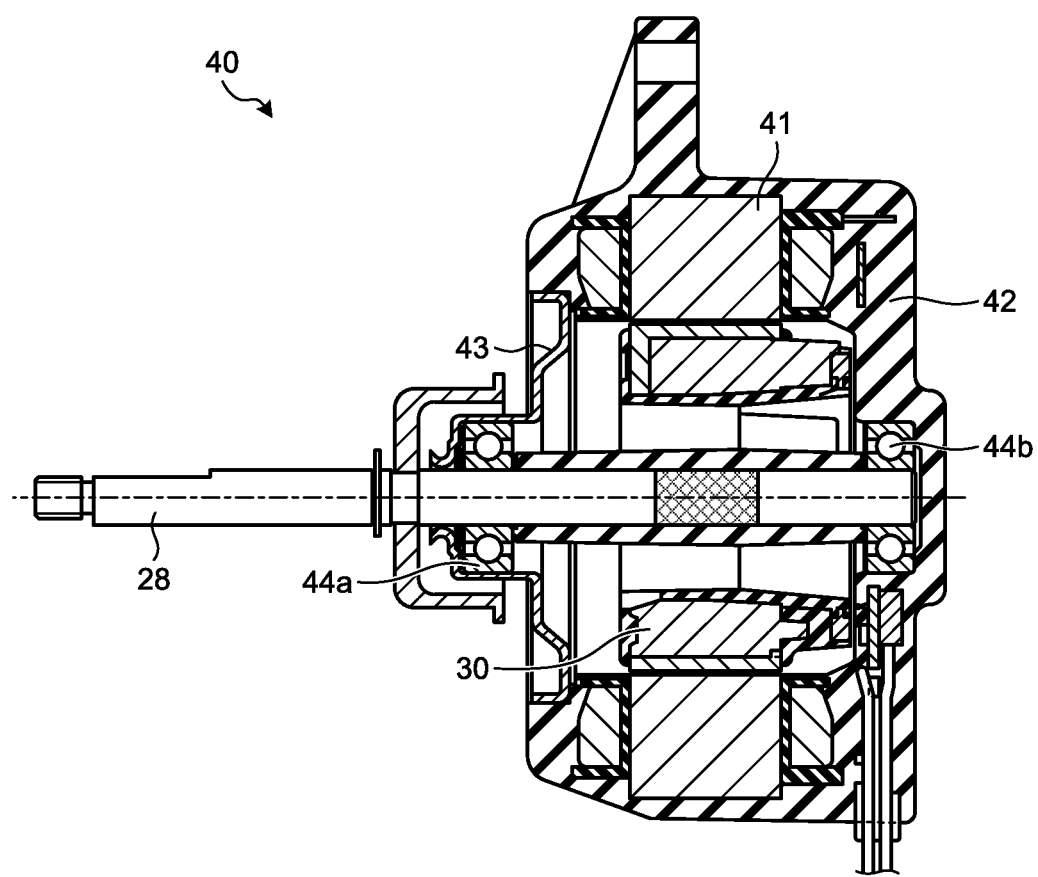
FIG. 8 is a longitudinal cross-sectional view illustrating a configuration of an electric motor according to the first embodiment.

FIG. 8 is a longitudinal cross-sectional view illustrating a configuration of an electric motor according to the present embodiment. An electric motor 40 includes a stator 41 having an annular shape, and a rotor 30 disposed inside the stator 41. In this regard, the stator 41 is encompassed by a resin portion 42. The resin portion 42 is formed of a thermosetting resin material. This thermosetting resin is, for example, a bulk molding compound. To the shaft 28 of the rotor 30, bearings 44a and 44b are attached. The bearing 44a is fit into a bracket 43 attached to the resin portion 42. The bearing 44b is attached to the resin portion 42.

As described above, the multiple pedestals 5, the multiple protrusions 7, and the multiple connecting portions 6 in the present embodiment are formed from a resin material containing at least one of soft magnetic powder and ferrite powder, as a part of the yoke 1. This can reduce the amount of rare-earth magnetic powder to be used in the rotor magnet 15, and can thus also reduce manufacturing cost of the rotor 30.

In addition, in the present embodiment, the multiple grooves 11 each serving as a channel for introducing the resin magnet material are formed on the end surface 3b of the yoke 1, and the rib runners 18 formed in the grooves 11 are cut off in the track of the channel to form the rib portions 20. This manner allows a part of each of the rib runners 18 to be reused, thereby enabling a reduction in the amount of the rare-earth magnetic powder to be used in the rotor magnet 15. Moreover, no formation of channels for introducing the resin magnet material in the pedestals 5 allows the structure of each of the pedestals 5, and hence the structure of the mold, to be simplified, and thus the manufacturing cost is reduced.

In the present embodiment, the connecting portions 6 each have a height less than the height of the pedestals 5. This configuration enables the channel for introducing the thermoplastic resin material into a space radially outside the pedestals 5 and the connecting portions 6 to be formed between the pedestals 5 when the rotor magnet 15, the sensor magnet 22, and the shaft 28 are integrated together using the thermoplastic resin material.

The connecting portions 6 are disposed radially in a middle position of the end surface 3a. This configuration causes the thickness of the portion radially inside the connecting portions 6, of the resin portion 31, and the thickness of the portion radially outside the connecting portions 6, of the resin portion 31, to be equal to each other. Thus, generation of sink marks is prevented during the molding, and so the rotor 30 is firmly integrated, thereby making it possible to improve the quality of the rotor 30.

In the present embodiment, the resin portion 31 buries the protrusions 7 to a certain height from the end surface 3a in the axial direction. In addition, the resin portion 31 connects the multiple protrusions 7. This configuration makes the rotor 30 firmly integrated, thereby improving the quality of the rotor 30.

In the present embodiment, the multiple recessed portions 8 are formed along the outer circumferential edge of the end surface 3a of the yoke 1. Filling the multiple recessed portions 8 with the resin magnet material during the formation of the resin magnet part 16 around the outer circumferential surface 4a of the yoke 1 allows the multiple protruding portions 19, which constitute a part of the resin magnet part 16, to fit into the multiple recessed portions 8, respectively. By this configuration, the resin magnet part 16 is subjected to stoppage against rotation in the circumferential direction with respect to the yoke 1. In particular, in a case of the yoke 1 having an outer circumference in a true circle shape, the multiple recessed portions 8 and the multiple protruding portions 19 are effective in rotation stoppage and in torque transmission, thereby improving the quality of the rotor 30.

The resin magnet material is introduced into the multiple grooves 11 to form the multiple rib portions 20. The multiple rib portions 20 serve as a rotation stopper for the resin magnet part 16 with respect to the yoke 1, thereby improving the torque transmission of the rotor 30. The multiple rib portions 20 also prevent axial misalignment of the resin magnet part 16.

A portion of each of the protrusions 7 extends out of the rotor 30. This configuration allows the multiple protrusions 7 to be used for positioning during magnetization of the rotor 30.

In the present embodiment, the rib runners 18 each have a height equal to the depth of the grooves 11. For this reason, an upper end surface of the rib portion 20 obtained by cut-off of part of the rib runner 18 is situated in a position of the end surface 3b of the yoke 1 in the axial direction. Moreover, the end surface 21b of the resin magnet part 16 is situated in a position of the end surface 3b of the yoke 1 in the axial direction. Therefore, the resin magnet part 16 has no shape that protrudes axially outwardly beyond the end surface 3b of the yoke 1. This configuration can reduce the thickness of the resin material provided axially outside the end surface 3b of the yoke 1, when the rotor magnet 15, the sensor magnet 22, and the shaft 28 are integrated together using the thermoplastic resin material, thereby leading to cost saving.

In the present embodiment, the multiple grooves 11 of the yoke 1 each serve as a channel for introducing the resin magnet material. This configuration simplifies the channels for introducing the resin magnet material, thereby improving the quality of the resin magnet part 16. Second Embodiment.

Figure 9:
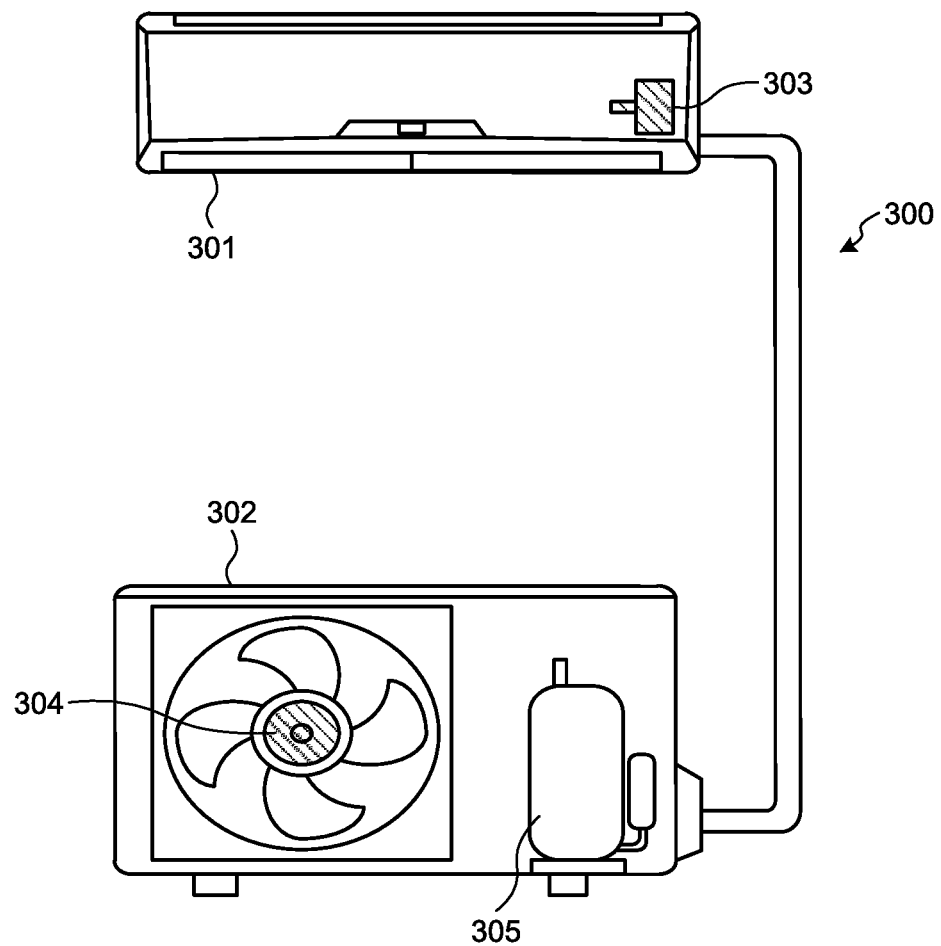
FIG. 9 is a diagram illustrating an example configuration of an air conditioner according to a second embodiment.

FIG. 9 is a diagram illustrating an example configuration of an air conditioner according to the present embodiment. An air conditioner 300 includes an indoor unit 301 and an outdoor unit 302 connected to the indoor unit 301. The indoor unit 301 includes an air blower 303. The outdoor unit 302 includes an air blower 304 and a compressor 305. The blowers 303 and 304, and the compressor 305 each include the electric motor according to the first embodiment. This configuration provides a cost reduction and a quality improvement of the air conditioner 300.

Note that the electric motor according to the first embodiment is also applicable to an electric device other than an air conditioner, and in this case similar advantages to those of the present embodiment can also be gained.

The configurations described in the foregoing embodiments are merely examples of contents of the present invention. These configurations can be combined with other publicly known techniques, and partially omitted and/or modified without departing from the scope of the present invention.

The invention claimed is:

1. An electric motor comprising a rotor comprising a first magnet having an annular shape and a second magnet having an annular shape, the second magnet being disposed at one end of the first magnet in an axial direction of the first magnet and being used for position detection, wherein the first magnet comprises
a first annular layer formed of resin containing at least one of soft magnetic powder and ferrite powder, and
a second annular layer disposed on an outer circumferential surface of the first annular layer, the second annular layer being formed of resin containing rare earth magnetic powder, the first annular layer comprises
an end surface in the axial direction,
first and second pedestals disposed on the end surface, arrayed in a circumferential direction of the first magnet, and having thereon the second magnet, and
a connecting portion disposed between the first and second pedestals adjacent to each other in the circumferential direction of the first magnet on the end surface, the connecting portion connecting the first and second pedestals, a height of the connecting portion from the end surface in the axial direction being smaller than a height of each of the first and second pedestals from the end surface in the axial direction, the connecting portion is disposed spaced apart, in the radial direction of the first magnet, from an inner circumferential surface and an outer circumferential surface of the first annular layer.

2. The electric motor according to claim 1, wherein
the rotor includes a shaft penetrating the first magnet and the second magnet, and a resin portion configured to integrate together the first magnet, the second magnet, and the shaft,
the first annular layer includes first and second protrusions disposed on the end surface, and arranged outside the first and second pedestals in a radial direction of the first magnet, respectively, the first and second protrusions each having a height from the end surface in the axial direction greater than a height of each of the first and second pedestals from the end surface in the axial direction, and
the first and second protrusions are each buried by the resin portion to a fixed height from the end surface in the axial direction so that a portion of each of the first and second protrusions extends out of the resin portion.

3. The electric motor according to claim 2, wherein the resin portion joins together the first and second protrusions.

4. The electric motor according to claim 2, wherein the first and second protrusions are disposed in positions of magnetic poles of the rotor, respectively.

5. An air conditioner comprising the electric motor according to claim 1.

6. The electric motor according to claim 3, wherein the first and second protrusions are disposed in positions of magnetic poles of the rotor, respectively.

7. The air conditioner according to claim 5, wherein
the rotor includes a shaft penetrating the first magnet and the second magnet, and a resin portion configured to integrate together the first magnet, the second magnet, and the shaft,
the first annular layer includes first and second protrusions disposed on the end surface, and arranged outside the first and second pedestals in a radial direction of the first magnet, respectively, the first and second protrusions each having a height from the end surface in the axial direction greater than a height of each of the first and second pedestals from the end surface in the axial direction, and
the first and second protrusions are each buried by the resin portion to a fixed height from the end surface in the axial direction so that a portion of each of the first and second protrusions extends out of the resin portion.

8. The air conditioner according to claim 7, wherein the resin portion joins together the first and second protrusions.

9. The air conditioner according to claim 7, wherein the first and second protrusions are disposed in positions of magnetic poles of the rotor, respectively.

10. The air conditioner according to claim 8, wherein the first and second protrusions are disposed in positions of magnetic poles of the rotor, respectively.

* * * * *